3,281,489
PURIFICATION OF BUTADIENE CONTAINING STREAM
Gordon D. Goering, Sweeny, Tex., assignor to Phillips Petroleum Company, a corporation of Delaware
Filed July 29, 1964, Ser. No. 385,913
4 Claims. (Cl. 260—681.5)

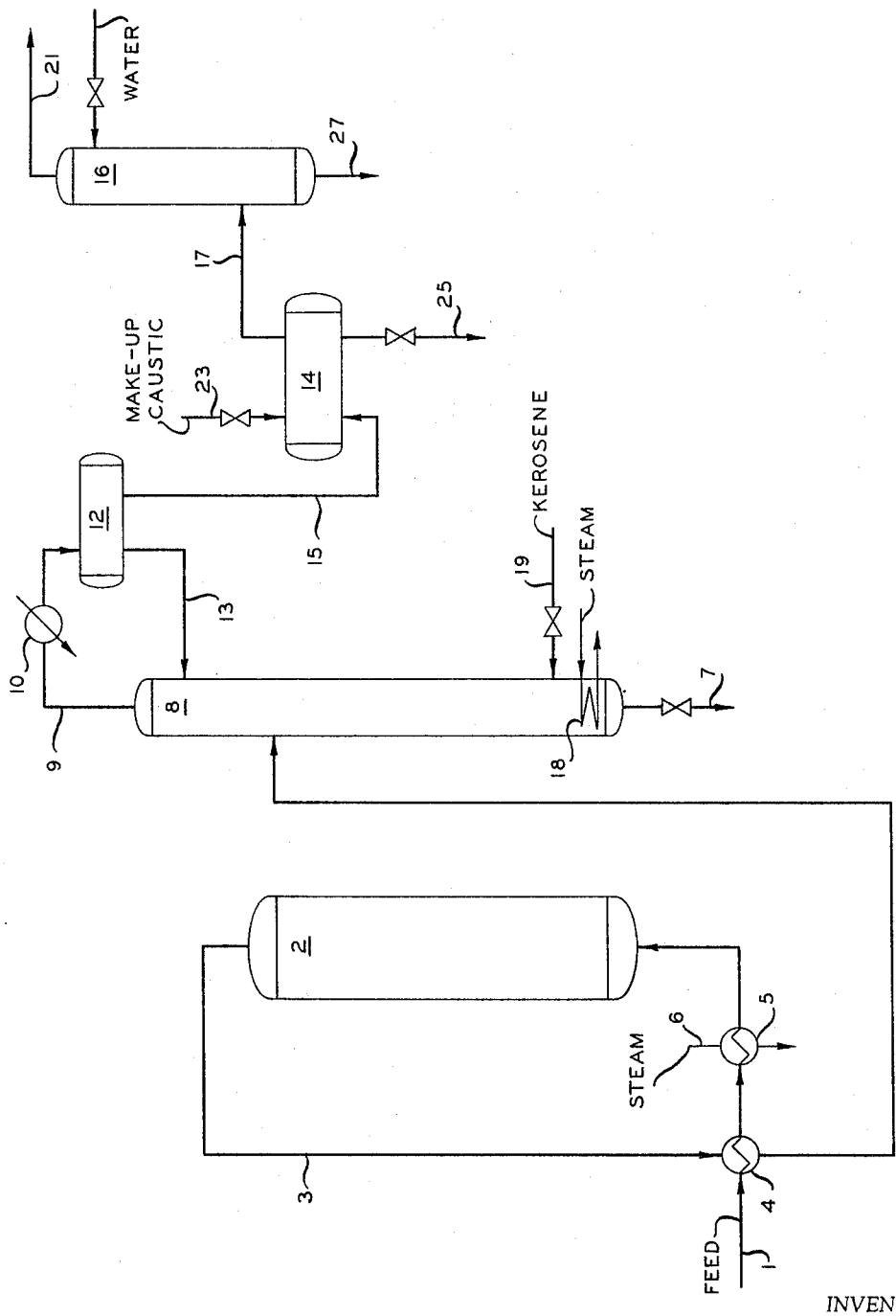

This invention relates to the removal of contaminants from a stream containing butadiene as the major component.

Butadiene containing streams are obtainable by various processes as major product or by-product streams, such as catalytic dehydrogenation or pyrolysis of saturated hydrocarbons. In the production of ethylene by pyrolysis of saturated hydrocarbons such as propane, a by-product stream containing butadiene as a major component is produced. Generally, high pyrolysis temperatures are employed in the cracking of saturated hydrocarbons to obtain the maximum yield of unsaturated hydrocarbons. However, the high temperatures cause formation of acetylenic and carbonyl compounds which contaminate the butadiene containing stream for subsequent use as, for example, in the preparation of synthetic rubber.

The removal of acetylenic compounds from butadiene containing streams has been a major problem in the industry and received much consideration. A most practical solution to this problem is to hydrogenate the acetylenes in the stream using a catalyst selective therefor without appreciably altering the butadiene content. Various catalysts for selective hydrogenation of acetylenes in the presence of butadiene to obtain their removal have been developed. The selective hydrogenation of acetylenes requires the use of elevated temperatures to substantially remove all of the acetylenes.

The butadiene containing streams also contain carbonyl compounds, aldehydes, which are contaminants to the subsequent use of the stream. The selective hydrogenation of acetylene will reduce the carbonyl concentration, but not sufficiently to eliminate its contaminating effect. Carbonyls have been removed from a butadiene containing stream by caustic washing the stream prior to the hydrogenation step which caustic treatment causes an aldol condensation reaction of the carbonyls to form high boiling range polymeric compounds. At the high temperatures employed for the subsequent selective hydrogenation of acetylenes, I have found that the carbonyl polymeric (aldol condensation) materials cause fouling of the process equipment, such as the hydrogenation zone feed heat exchangers, which adversely affects the removal of acetylenes from a stream containing butadiene.

Accordingly, an object of this invention is to provide an improved process for the purification of a butadiene containing stream.

Another object of this invention is to provide a process for the substantial removal of both acetylenes and carbonyls from a stream containing butadiene.

Still another object of this invention is to provide a combination of steps comprising (1) first, selective hydrogenation of acetylenes in a butadiene stream, and (2) then, treating the hydrogenation product to effect aldol condensation of carbonyls from a butadiene containing stream wherein neither step adversely hinders the result of the other step.

A further object of the invention is to provide apparatus for effecting removal of acetylenes and carbonyls from a butadiene stream which does not result in process fouling.

Other objects, aspects and advantages of this invention will be apparent to one skilled in the art upon further study of this disclosure, the drawing, and appended claims.

In accordance with the invention, the above noted fouling problems are eliminated by catalytically hydrogenating the butadiene stream to remove acetylenes and reduce the carbonyls, fractionating the resulting effluent to remove polymer oils, and caustic washing the butadiene stream to remove substantially all of the remaining carbonyls.

A better understanding of the invention can be obtained by reference to the drawing coupled with the following detailed description.

Referring now to the drawing, which is a diagrammatic representation of the apparatus arrangement of process flow scheme of the invention, a feed stream containing butadiene as a major component and minor amounts of acetylenes and aldehydes is passed through conduit 1, indirect heat exchange zones 4 and 5, and into hydrogenation catalyst case 2. Steam is passed to heat exchange zone 5 via conduit 6. Effluent from catalyst case 2 passes through conduit 3 and heat exchange zone 4 into fractionation zone 8. Since this stream 1, in accordance with this invention, has not been caustic treated, there are no aldol condensation products in this stream 1, and no polymer deposits are laid down on the feed heat exchangers 4 and 5. Heat is added to the bottom of zone 8 by any suitable means such as steam coil 18, as shown. To insure sufficient liquid in the bottom of zone 8, a kerosene fraction is introduced thereto through valved conduit 19 as needed. Heavy polymeric oils, termed "green oil," are removed (in kerosene) as bottoms from zone 8 through conduit 7. The process stream is removed as overhead through conduit 9, cooled by heat exchange means 10, and introduced in accumulator 12. A portion of the cooled overhead is returned to the upper portion of zone 8 via conduit 13, as liquid reflux. The product portion of the overhead liquid passes through conduit 15 into caustic washer 14. Fresh caustic, as needed, is added to washer 14 through valved conduit 23 and the spent caustic is removed through conduit 25. The process stream passes from caustic washer 14 through conduit 17 into the lower portion of water washer 16. Water is introduced into the upper portion of washer 16 and the washings are removed through conduit 27. The purified product is recovered through conduit 21 and passed to subsequent equipment, not shown, such as driers, storage tanks, to other processes, and the like.

Any catalyst selective for the hydrogenation of acetylene in the presence of butadiene can be employed. Several such catalysts are available, with a preferred one being about 99.9 weight percent finely divided copper and the balance being at least one finely divided metal of the group Fe, Ni, Ru, Rh, Pd, Ir and Pt, the metals being dispersed on a carrier such as activated gamma alumina or kappa alumina. This catalyst is more fully described in U.S. Patent 3,076,858.

In the past, the fouling of the equipment and process streams mainly occurs in indirect heat exchange zones 4 and 5 due to the increasing temperatures imparted to the process stream which had been subjected to caustic wash prior to being charged to the hydrogenation zone. Operation in accordance with this invention does not result in fouling of zones 4 and 5 while removing substantially all of the aldehydes and acetylenes present in the butadiene feed stream.

*Example*

The following material balance of stream flow in regard to the drawing shows the effect of acetylene and aldehydes from the butadiene stream.

| Component | Stream (Liquid Vol. Percent) | | | Equipment Conditions | | |
|---|---|---|---|---|---|---|
| | 1 | 15 | 21 | | 2 | 8 |
| Propylene | 0.6 | 0.6 | 0.6 | Pressure (p.s.i.g.) | 45 | 25 |
| Propane | 1.2 | 1.1 | 1.1 | Temperature (° F.): | | |
| Butylenes | 30.7 | 36.2 | 36.2 | Inlet | 330 | ---- |
| Butadiene | 62.4 | 57.3 | 57.3 | Top | ---- | 50 |
| iso-Butane | 0.7 | 0.7 | 0.7 | Bottom | ---- | 200 |
| n-Butane | 4.4 | 4.1 | 4.1 | | | |
| Methyl and Vinyl Acetylenes (p.p.m.) | 500–10,000 | <300 | <300 | | | |
| Carbonyls (p.p.m.) | 400–1,000 | 200–500 | <100 | | | |
| Rates (Bbls./Day) | 600 | 600 | [1] 600 | | | |

[1] Less 4 pounds/day of "green oil" polymer removed through conduit 7.
P.p.m. = parts per million by weight.
< = less than.

Reasonable variations and modifications are possible within the scope of the foregoing disclosure, the drawings and the appended claims to the invention.

I claim:

1. A process for purifying a stream containing butadiene comprising: selectively hydrogenating the acetylenes present therein; fractionating the hydrogenated stream; subjecting the butadiene containing fraction to an aldol condensation reaction for removal of carbonyls therein; and recovering a purified butadiene containing stream.

2. A process for removing acetylenes and carbonyls from a hydrocarbon stream containing butadiene comprising: passing said stream to a hydrogenation zone containing catalyst selective for acetylene conversion; passing the hydrogenation zone effluent to a fractionation zone; removing polymeric constituents as bottoms from said fractionation zone; passing the butadiene containing stream from said fractionation zone to a washing zone containing caustic for reacting with the carbonyl constituents; and recovering a butadiene containing stream substantially free of acetylenes and carbonyls.

3. A process for upgrading a stream containing predominantly butadiene comprising: passing said stream through a heat exchange zone into a hydrogenation zone containing at least 99.9 weight percent copper and the remainder a metal selected from the group consisting of Fe, Ni, Ru, Rh, Pd, Ir and Pt, the metals being dispersed on a carrier selected from the group consisting of activated gamma alumina and kappa alumina; passing the hydrogenation zone effluent substantially free of acetylenes to a fractionation zone; passing a kerosene fraction to said fractionation zone to maintain a liquid phase in said zone, removing polymeric oils as bottoms from said zone; removing an overhead gaseous stream containing butadiene as overhead from said zone; condensing said overhead stream; passing the condensed overhead stream into a wash zone containing sodium hydroxide wherein the carbonyls are reduced by an aldol condensation reaction; passing the butadiene containing stream to a water wash zone; and recovering a purified butadiene containing stream substantially free of acetylenes and carbonyls.

4. The process of claim 3 wherein said heat exchange zone comprises first and second stages further comprising: passing said hydrogenation zone effluent through said first stage and then into said fractionation zone; and steam is passed through said second stage.

References Cited by the Examiner

UNITED STATES PATENTS

| 2,775,634 | 12/1956 | Nowlin | 260—681.5 |
| 2,814,653 | 11/1957 | Hogan et al. | 260—681.5 |
| 2,851,504 | 9/1958 | Hogan | 260—681.5 |
| 3,076,858 | 2/1963 | Frevel et al. | 260—681.5 |
| 3,200,167 | 8/1965 | Reich | 260—681.5 |

DELBERT E. GANTZ, *Primary Examiner.*

G. E. SCHMITKONS, *Assistant Examiner.*